United States Patent [19]

Kezran

[11] 4,174,916
[45] Nov. 20, 1979

[54] FORMING TOOL CONSTRUCTION

[75] Inventor: Mitchell Kezran, Cranston, R.I.

[73] Assignee: Precision Industries, Inc., Providence, R.I.

[21] Appl. No.: 899,888

[22] Filed: Apr. 24, 1978

[51] Int. Cl.² ............................................. B26D 1/12
[52] U.S. Cl. ..................................... 407/108; 407/70; 407/73; 407/76; 407/103
[58] Field of Search ................... 407/108, 47, 48, 49, 407/51, 60, 61, 62, 66, 67, 68, 69, 70, 71, 85, 86, 87, 102, 103, 107, 112, 73

[56] References Cited

U.S. PATENT DOCUMENTS

| 946,599 | 1/1910 | Goetz | 407/108 |
| 2,656,590 | 10/1953 | Hooper | 407/86 |
| 2,908,963 | 10/1959 | Gollus | 407/107 |
| 3,200,474 | 8/1965 | Kralowetz | 407/60 |
| 3,253,322 | 5/1966 | Christian | 407/89 |
| 3,303,728 | 2/1967 | Testa | 407/108 |
| 3,371,567 | 3/1968 | Davis | 407/108 |
| 3,512,236 | 5/1970 | Renaud | 407/85 |
| 3,513,518 | 5/1970 | Lekan | 407/112 |
| 3,899,813 | 8/1975 | Lovendahl | 407/86 |

Primary Examiner—Harrison L. Hinson
Attorney, Agent, or Firm—Salter & Michaelson

[57] ABSTRACT

A forming tool generally having a dove-tail shaped machine connector provided with an integral outwardly extending front support which in cooperation with the front surface of the tool is adapted to receive a forming insert. The front support is provided with a slot for receipt of locking wedges as to lock the insert in position with respect to the tool. The front support is positioned below the working edge of the insert and the tool is further provided with means for positioning the insert laterally with respect to the slot.

13 Claims, 14 Drawing Figures

FORMING TOOL CONSTRUCTION

BACKGROUND AND SUMMARY OF THE INVENTION

This invention relates to a forming tool such as may be utilized to shape metal parts as by cutting. One such common type of tool generally is referred to as a dove-tailed tool and includes an outwardly extending front cutting surface adapted to engage the work piece and a dove-tailed shaped wedge downwardly extending from a base thereof to engage a similarly shaped vertically orientated dove-tailed slot in a machine or other tool holder. Generally such dove-tailed tool is of integral one-piece construction and accordingly must be periodically sharpened as by removal of the tool from its holder which in turn necessitates repositioning thereof. Also, after a number of successive sharpenings the front face of the tool will no longer overhang base portions thereof and thereafter the entire tool must be discarded.

It would accordingly be desirable to be able to position a replaceable forming element, i.e. a cutting insert, with respect to such a tool so that when the cutting edge becomes dull, only the insert would have to be removed. This would eliminate removal of the entire tool from the holding device and would further eliminate the necessity of eventually discarding the entire tool when worn. The use of an insert in conjunction with a forming tool would further permit the cooperative use of a shim or shims such that it or they would absorb a portion of the shock transmitted to the tool via its contact with the work piece.

It is accordingly a primary object of the present invention to provide a forming tool of novel construction which permits the use of a tool insert at the front working face thereof in such a manner that the means by which such insert is held in place does not interfere with the working of the tool.

A further object of the prsent invention is the provision of a tool of the aforementioned type in which positive positioning means are included such that the insert may contact three separate surfaces so as to positively spacially position such with respect to the remaining portions of the tool.

These and other objects of the invention are accomplished by the provision of an integral front support outwardly extending from the front working face of such a tool, which support includes a transversely extending slot, in turn adapted to receive wedge means wherein the insert is held against the front tool face. Furthermore, means for positioning the insert laterally within the slot is also provided.

Other objects, features and advantages of the invention shall become apparent as the description thereof proceeds when considered in connection with the accompanying illustrative drawing.

DESCRIPTION OF THE DRAWINGS

In the drawings which illustrate the best mode presently contemplated for carrying out the present invention.

DESCRIPTION OF THE INVENTION

Figure 1:
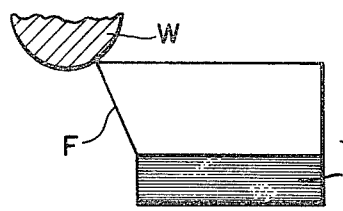
FIG. 1 is a side elevational view showing a conventional dove-tail type tool.
Figure 2:
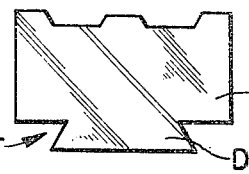
FIG. 2 is a front elevational view of FIG. 1.

Referring now to the drawings and in particular FIGS. 1 and 2 thereof, a conventional tool commonly referred to as a dove-tailed tool is shown. Such includes a body having a front working face F and a dove-tailed shaped wedge D downwardly extending therefrom and adapted for receipt in a similarly shaped dove-tailed slot provided in the tool holder, i.e. a metal cutting machine such as a lath, grinder, borer, etc. Although the present invention will be explained with relationship to the above commonly referred to dove-tailed tool and has particular utility therewith, it should be pointed out that other tool configurations exhibiting a front working surface having similar constructional features are also included in the invention and that the invention is accordingly not solely limited to tools of the so-called dove-tailed configuration.

Figure 3:
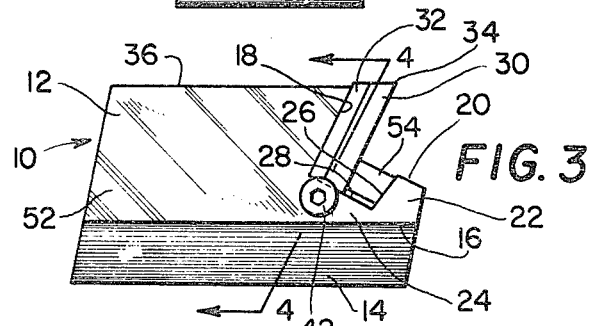
FIG. 3 is a side elevational view embodying one constructional form of the present invention.
Figure 4:
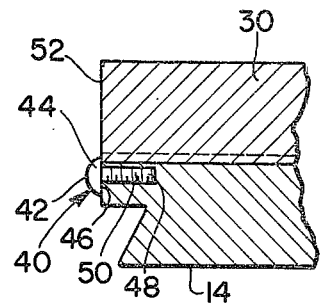
FIG. 4 is a partial sectional view taken along the line 4—4 of FIG. 3.
Figure 5:
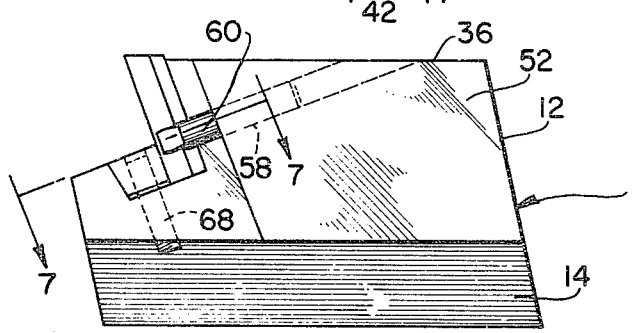
FIG. 5 is a side elevational view of a tool holder and embodying an alternate constructional form of the present invention.

Referring now to FIGS. 3 and 4 of the drawings, one constructional form of the tool 10 of the present invention is shown. Such includes a body 12 of block-like construction from which an integral dove-tailed shaped wedge 14 extends from the bottom surface 16 thereof. The forward portion of the body or block 12 is provided with a front face or surface 18 which is in turn adapted to face the work piece W during use of the machine or device in which the tool 10 is positioned. The block 12 further includes an integral front support 20 outwardly and generally downwardly extending from the front surface 18 and preferably positioned at the lower terminus theref.

The outwardly extending front support 20 is of generally hook-shaped configuration, that is, it includes an outer upwardly extending wall 22 and a connecting web portion 24. Additionally, the support 20 is adapted to overlie the front portions of the dove-tail shaped wedge 14 and the outer front surface of the wall 22 is preferably co-extensive with the outer front surface of the dove-tail portion 14.

The front surface 18, the connecting web 24 and the front wall 22 cooperatively form a slot 26 which transversely extends along the front surface 18 adjacent its lower terminus. Such slot 26 includes a base wall 28 which is preferably positioned normal to the front surface 18. Also, although such wall or surface 28 is shown as planar, it may incude a stepped configuration so long as such provides adequate positioning for an insert 30 and a shim 32 as will hereinafter be evident.

Such shim 32 and/or the insert 30, in the case where no shim is utilized, are adapted to be positioned in flush contact with the front surface 18 in such a manner that the working edge 34 of the insert 30 is adapted to preferably extend at least slightly above the upper surface 36 of the block 12. Thus by contact between the insert 30 and the front face 18, the angular disposition of the insert with regard to the tool is determined and the height at which such insert is disposed thereto furthermore provided by contact of its lower edge with the base wall 28 of the slot 26

In order to laterally position the insert 30 with regard to the tool 10, positioning means 40 is included. Such positioning means in the embodiment hereunder consideration comprises a screw 42 having a head 44 which has a flat inner surface 46. The screw further includes a threaded shaft 48 adapted to engage a bore 50 inwardly extending from the sidewall surface of the block 12 in a location proximal the termination of the slot 26 at such sidewall such that the head 44 at least partially projects into such slot. In this manner, the flat inner surface 46 of the head 44 is presented for contact with at least a side edge of the insert 30 such that the insert may be positioned transversely of the slot 26 and accordingly similarly transversely disposed with respect to the block 12. Such positioning means 40 thus provides the third and remaining surface of the three such surfaces necessary to position the insert in a positive spacial relationship with regard to the block 12 such relationship enabling the desired cutting or other forming action to be imparted to the work piece W.

In order to maintain the insert in such spacial position, at least one wedge 54 is positioned within the slot 26 and adapted to engage outer face portions of the insert 30 and inner portions of the slot wall 22. The wedge 54 is maintained in such position by means of an oppositely threaded double-ended screw (not shown) mutually engaged with such wedge and passing through the base wall 28 of the slot.

Turning now to FIGS. 5 through 8 of the drawings, a further constructional embodiment of the present invention and similar to that shown in FIGS. 3 and 4 is shown. Such modified tool 10a is essentially similar in construction to tool 10 except for the provision of a block extension 56 in which the positioning means 40 is housed. Such extension 56 comprises an integral portion of the block 12 and is provided with an angularly disposed bore 58 in which the base of a pin 60 is secured by any known means and including a force fit. The outer end of the pin 60 is provided with an extension 62 having a longitudinally extending arcuately shaped outer surface 64. Such extension 62 is adapted to be positioned adjacent to an outer edge of the insert 30 in such a manner that a substantially line contact is formed therebetween and in such manner provides for the transverse positioning of such an insert relative to the block 12.

Figure 6:
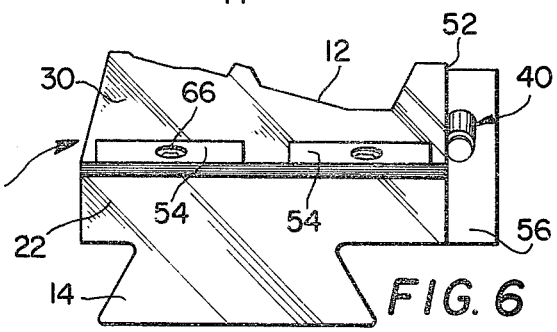
FIG. 6 is a front elevational view of FIG. 5.
Figure 8:
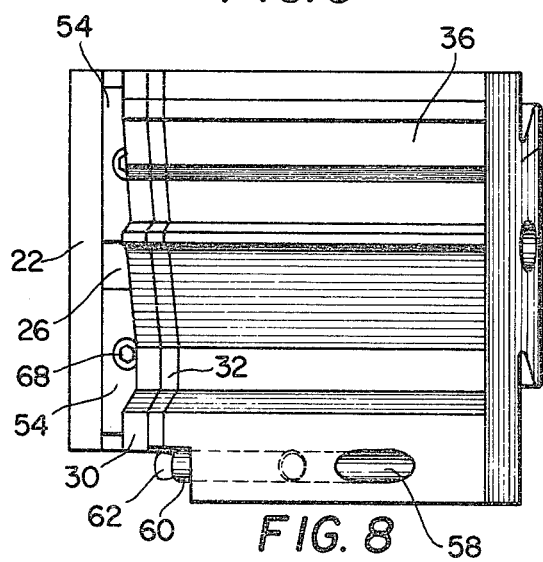
FIG. 8 is a top plan view of FIG. 5.
Figure 7:
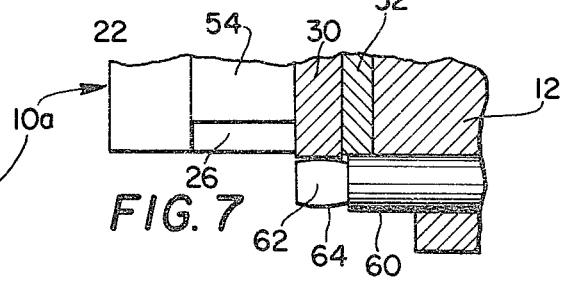
FIG. 7 is a partial sectional view taken along the line 7—7 of FIG. 5.

It should also be apparent from reference to FIGS. 6 and 8 that two laterally spaced wedges 54 are utilized to maintain the position of the insert 30 with respect to the block 12. Each such wedge 54 is provided with a threaded bore 66 in which a screw 68 such as the oppositely threaded double-ended screw referred to in the discussion of tool 10 and as shown in FIGS. 3 and 4. The use of two such wedges 54 is particularly advantageous when the transverse extent of the tool is rather extensive and in those cases as will hereinafter be explained in reference to FIGS. 9 through 11, wherein it is desired to form a notch or channel within the work piece W and accordingly wherein the positioning means 40 must be located entirely inwardly of the sidewalls of the block.

Figure 9:
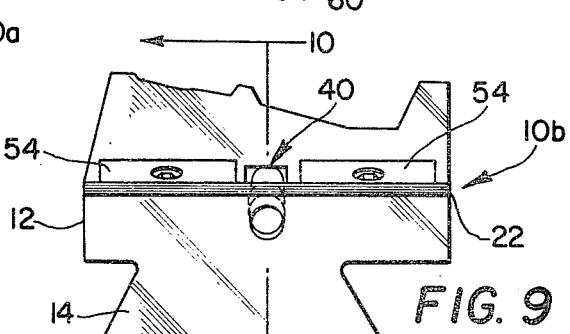
FIG. 9 is a front elevational view of a tool holder embodying a still further alternate constructional form of the present invention.
Figure 10:
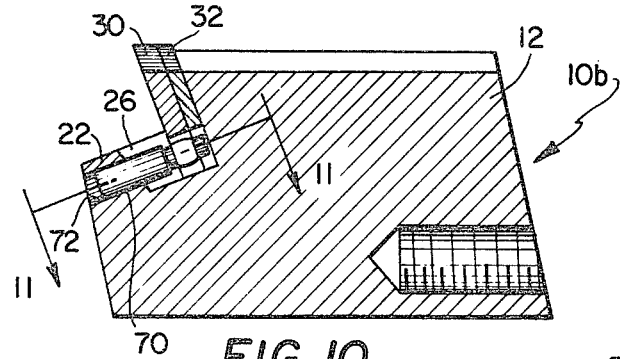
FIG. 10 is a side sectional view taken along the line 10—10 of FIG. 9.
Figure 11:
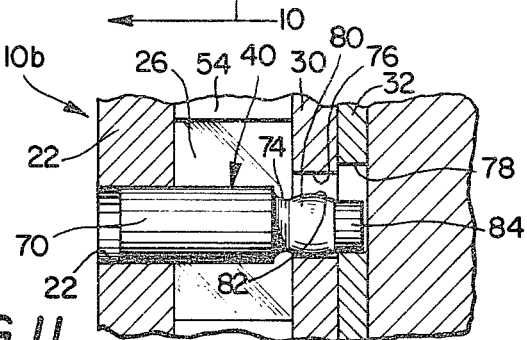
FIG. 11 is a partial sectional view taken along the line 11—11 of FIG. 10.

Referring now to FIGS. 9 through 11 of the drawings, a tool 10b similar in construction to tools 10 and 10a is shown. Therein, the transverse positioning means 40 includes a pin 70 adapted for receipt in a bore 72 provided within the wall 22 and extending therethrough. The pin 70 also spans slot 26. The pin 70 is force fitted in such bore 72 and is provided with a terminal portion 74 adapted to be positioned within and in contact with the shim and insert. The terminal portion 74 thus extends into laterally extending openings 76 and 78 respectively provided in intermediate portions of the insert 30 and the shim 32 and at least partially aligned with each other. The pin extension 74 is provided with a first portion 80 having a longitudinally arcuately shaped outer surface 82 and a generally cylindrical head 84 further inwardly extending therefrom. The arcuate surface 82 is adapted to contact interior transverse edge portions of the opening 76 in substantial line contact at one side thereof whereas the head 84 contacts one side or edge of the opening 78 in substantial flush contact.

It should thus be understood that the line contact between the intermediate section 80 of the pin 70 with one side of the opening 76 provides the necessary lateral or transverse positioning of the insert 30 with respect to the block 12. Such spacial positioning is maintained by means of a pair of wedges 54 laterally spaced from each other within the slot 26. The pin extends through such wedge spacing into the openings 76 and 78 of the insert and shim respectively.

Figure 12:
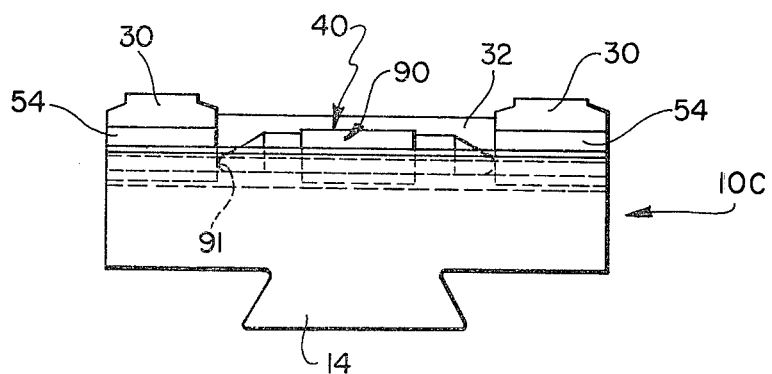
FIG. 12 is a front elevational view of a tool holder embodying another alternate constructional form of the present invention
Figure 13:
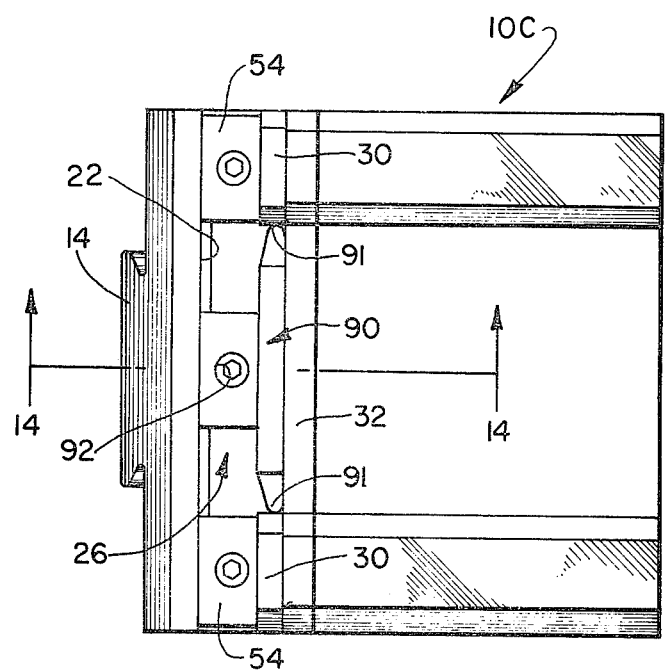
FIG. 13 is a top plan view of FIG. 12.
Figure 14:
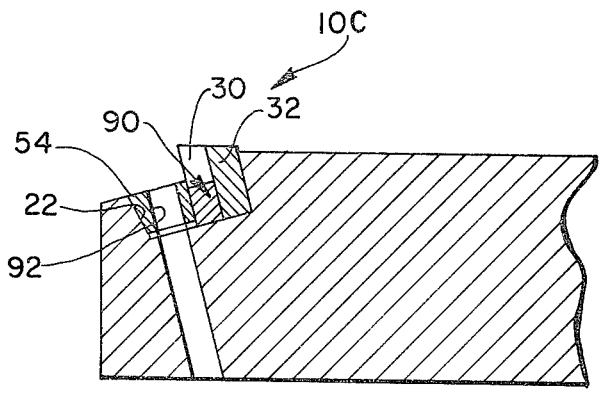
FIG. 14 is a side sectional view taken along the line 14—14 of FIG. 13.

Referring now to FIGS. 12-14 of the drawings, a tool 10c similar in construction to tools 10, 10a and 10b is shown but useful to cut spaced grooves and the like into a work piece. Therein the transverse positioning means 40 includes a locator 90 which is disposed within slot 26 intermediate a pair of spaced cutting inserts 30. A shim 32 is positioned behind such locator and inserts. Each end of the locator preferably terminates in rounded ends 91 which thus are adapted to contact the inner flat surfaces of the inserts 30 in substantial line contact. The width of the locator thus determines the position the inserts 30 will assume with respect to the tool 10c. In front of each insert 30 and the locator 90 is a separate wedge 54 positioned within the slot 26 and adapted to engage the adjacent insert or locator and inner portions of the slot wall 22. The wedges are forced into position by a threaded screw or bolt 92 and thus assure the inserts 30 are held in their proper positions when the tool is in use.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dove-tailed forming tool adapted for receipt in a dove-tailed holder of a machine for plunge forming of a workpiece comprising, a block including front, top and bottom faces, said block having an integral dove-tail extending along the bottom face thereof for releasable engagement in a dove-tailed slot of a holder, said block including a generally vertically oriented front face and an integral front support overlying said dove-tail and extending forwardly of said front face, a laterally extending open top slot having a base wall formed in the upper surface of said support and disposed rearwardly of the forward extent of said support so as to dispose said base wall adjacent said front face and an upstanding slot wall adjacent said base wall and disposed in opposed relation to said front face, a forming insert having a top working surface, a bottom surface, and rear and front surfaces, said insert disposed in said slot with said insert bottom surface supported by said slot base wall and said insert rear surface disposed against said block front face, at least one insert wedge disposed in said slot and adapted to mutually contact said upstanding slot wall and the face surface of said insert so as to securely clamp said insert to said block and positioning means for fixing the position of said insert within said slot with respect to said block.

2. The forming tool of claim 1, the top working surface of said insert being generally coplanar with the top face of said block.

3. The forming tool of claim 1, including a shim positioned between said insert and said block front face.

4. The forming tool of claim 1, said means for laterally positioning said insert with respect to the body being located on one of the sidewalls of said block and extending at least partially across the open end of said slot proximal said one sidewall.

5. The forming tool of claim 4, said lateral positioning means being a screw having a generally flat inner head surface threadably engaged with said block, said insert adapted to contact said inner head surface thereof.

6. The forming tool of claim 1, said lateral positioning means being an arcuate surface pin extending at least partially across said slot for essentially line contact with an edge portion of said insert.

7. The forming tool of claim 6, said pin extending across one of the open ends of said slot proximal the block sidewall.

8. The forming tool of claim 6, said pin spanning said slot intermediate the ends thereof.

9. The forming tool of claim 8, said pin having a base portion positioned in said front support and extending through upstanding said front support upstanding slot wall.

10. The forming tool of claim 8, said insert having an opening intermediate the transverse extent thereof, said pin having an extension adapted to be positioned in said opening and in contact with one of the side edges of said opening so as to transversely position said insert in said slot.

11. The forming tool of claim 1, said slot base wall disposed at a 90° angle to said front face.

12. The forming tool of claim 1, there being a pair of spaced inserts positioned in said slot, said lateral positioning means comprising a locator positioned in said slot between said inserts and with the inner surfaces of said inserts in contact with opposite edges of said locator, there being a separate wedge for contacting each said insert and said locator.

13. The forming tool of claim 12, said wedges threadably engaged to said slot by screws, said screws positioned in bores passing through said front support and opening at said block bottom face at one end and at said slot base wall at the other ends thereof.

* * * * *